(12) United States Patent
Ichida et al.

(10) Patent No.: US 12,539,941 B2
(45) Date of Patent: Feb. 3, 2026

(54) BICYCLE DERAILLEUR

(71) Applicant: SHIMANO INC., Sakai (JP)

(72) Inventors: Tadashi Ichida, Sakai (JP); Toshio Tetsuka, Sakai (JP); Hiroshi Matsumoto, Sakai (JP); Naoshi Fujita, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/791,386

(22) Filed: Jul. 31, 2024

(65) Prior Publication Data
US 2024/0391558 A1     Nov. 28, 2024

Related U.S. Application Data

(60) Continuation of application No. 17/993,849, filed on Nov. 23, 2022, now Pat. No. 12,077,244, which is a
(Continued)

(51) Int. Cl.
*B62M 25/08*     (2006.01)
*B62M 9/122*     (2010.01)

(52) U.S. Cl.
CPC ............ *B62M 25/08* (2013.01); *B62M 9/122* (2013.01)

(58) Field of Classification Search
CPC ...... B62M 25/08; B62M 9/122; B62M 9/132; G08C 17/02
(Continued)

(56) References Cited

U.S. PATENT DOCUMENTS 4,077,485 A * 3/1978 Bonora ............... B62J 11/00
                                              180/68.5
5,211,583 A * 5/1993 Endo ............... H01R 13/4368
                                              439/598
(Continued)

FOREIGN PATENT DOCUMENTS

CN     105836036     8/2016
CN     105936324     9/2016
(Continued)

OTHER PUBLICATIONS

Office Action issued by the U.S. Patent and Trademark Office for the U.S. Appl. No. 16/556,241, Oct. 21, 2021.
(Continued)

*Primary Examiner* — Henry Y Liu
(74) *Attorney, Agent, or Firm* — MORI & WARD, LLP

(57) ABSTRACT

A bicycle derailleur includes a base member, a movable member, a linkage structure, a wireless communicator, an electrical connector receiving portion, and a power supply portion. The movable member is movable with respect to the base member. The linkage structure is connected with the base member and the movable member. The wireless communicator is disposed at at least one of the base member, the movable member and the linkage member. The electrical connector receiving portion is configured to receive a connector. The power supply portion is configured to receive electricity from a battery disposed at a location apart from the bicycle derailleur. The electrical connector receiving portion is configured to be electrically connected to the power supply portion. The battery is configured to be charged with electricity through the electrical connector receiving portion and the power supply portion.

16 Claims, 12 Drawing Sheets

Related U.S. Application Data division of application No. 16/556,241, filed on Aug. 30, 2019, now Pat. No. 11,535,339.

(58) Field of Classification Search
USPC .................................................. 474/80, 82
See application file for complete search history.

(56) References Cited

U.S. PATENT DOCUMENTS

| | | | | |
|---|---|---|---|---|
| 5,213,548 | A * | 5/1993 | Colbert | B62M 25/08 280/238 |
| 5,480,356 | A * | 1/1996 | Campagnolo | B62M 9/122 280/238 |
| 5,577,969 | A * | 11/1996 | Watarai | B62M 9/122 474/78 |
| 6,162,140 | A * | 12/2000 | Fukuda | B62M 25/08 474/81 |
| 6,244,415 | B1 * | 6/2001 | Fujii | B62M 25/00 192/217 |
| 6,423,443 | B1 * | 7/2002 | Tsuboi | B60K 1/04 180/68.5 |
| 6,453,262 | B1 * | 9/2002 | Kitamura | B62M 25/00 474/70 |
| 6,558,180 | B2 * | 5/2003 | Nishimoto | H01R 9/223 439/282 |
| 6,600,411 | B2 * | 7/2003 | Nishimoto | B62M 25/08 340/432 |
| 6,623,389 | B1 * | 9/2003 | Campagnolo | B62M 25/08 474/70 |
| 6,648,686 | B2 * | 11/2003 | Nishimoto | H01R 13/112 439/605 |
| 6,761,655 | B2 * | 7/2004 | Fukuda | B62M 25/08 474/70 |
| 6,843,741 | B2 * | 1/2005 | Fujii | B62M 9/127 280/238 |
| 6,979,009 | B2 * | 12/2005 | Ichida | B62M 9/132 280/238 |
| 7,306,531 | B2 * | 12/2007 | Ichida | B62M 9/122 474/70 |
| 7,341,532 | B2 * | 3/2008 | Ichida | B62M 9/132 474/70 |
| 7,373,232 | B2 * | 5/2008 | Guderzo | B62M 9/122 74/502.2 |
| 7,442,136 | B2 * | 10/2008 | Ichida | B62M 9/132 474/82 |
| 7,553,247 | B2 * | 6/2009 | Guderzo | F16H 61/2807 474/70 |
| 7,704,173 | B2 * | 4/2010 | Ichida | B62M 9/132 474/82 |
| 7,762,916 | B2 * | 7/2010 | Ichida | B62M 9/132 474/82 |
| 7,980,974 | B2 * | 7/2011 | Fukuda | B62M 9/122 474/70 |
| 8,025,597 | B2 * | 9/2011 | Takamoto | B62M 25/08 474/70 |
| 8,137,223 | B2 * | 3/2012 | Watarai | B62M 9/1244 474/81 |
| 8,241,158 | B2 * | 8/2012 | Ishikawa | B62M 9/132 474/82 |
| 8,282,519 | B2 * | 10/2012 | Ichida | B62M 9/132 474/82 |
| 8,721,495 | B2 * | 5/2014 | Kitamura | B62M 25/08 477/7 |
| 8,864,611 | B2 * | 10/2014 | Kuwayama | B62M 9/135 474/82 |
| 8,882,122 | B2 * | 11/2014 | Emura | B62M 25/08 280/200 |
| 8,888,620 | B2 * | 11/2014 | Emura | B62M 9/135 474/82 |
| 8,979,683 | B2 * | 3/2015 | Katsura | B62M 25/08 474/82 |
| 9,037,368 | B2 * | 5/2015 | Miglioranza | B62M 25/08 701/64 |
| 9,151,379 | B2 * | 10/2015 | Kuroda | B62M 25/04 |
| 9,371,103 | B2 * | 6/2016 | Fujii | B62J 3/14 |
| 9,381,974 | B2 * | 7/2016 | Katsura | B62M 9/122 |
| 9,446,816 | B2 * | 9/2016 | Cracco | B62M 9/122 |
| 9,573,652 | B2 * | 2/2017 | Kuwayama | B62M 9/12 |
| 9,616,964 | B2 * | 4/2017 | Kasai | B62L 3/02 |
| 9,676,444 | B2 * | 6/2017 | Shipman | B62M 9/122 |
| 9,676,446 | B2 * | 6/2017 | Pasqua | B62M 9/132 |
| 9,873,482 | B2 * | 1/2018 | Nishino | B62M 9/135 |
| 9,890,838 | B2 * | 2/2018 | Shipman | B62M 9/132 |
| 9,963,197 | B2 * | 5/2018 | Watarai | B62J 43/30 |
| 10,137,964 | B2 * | 11/2018 | Kurokawa | B62K 23/00 |
| 10,363,992 | B2 * | 7/2019 | Watarai | B62M 25/08 |
| 10,843,757 | B2 * | 11/2020 | Komatsu | B62K 25/10 |
| 10,981,625 | B2 * | 4/2021 | Brown | B62M 1/36 |
| 2002/0190173 | A1 | 12/2002 | Fujii | B62M 25/08 248/300 |
| 2005/0170889 | A1 * | 8/2005 | Lum | H04W 84/22 463/39 |
| 2005/0187051 | A1 * | 8/2005 | Fujii | B62M 25/045 474/70 |
| 2006/0058134 | A1 * | 3/2006 | Mercat | B62M 25/045 474/80 |
| 2006/0186631 | A1 * | 8/2006 | Ishikawa | B62M 25/08 280/260 |
| 2007/0037645 | A1 * | 2/2007 | Ishikawa | B62M 25/08 474/70 |
| 2008/0312799 | A1 * | 12/2008 | Miglioranza | B62M 25/08 701/66 |
| 2009/0098963 | A1 * | 4/2009 | Watarai | B62M 25/04 474/80 |
| 2011/0320093 | A1 * | 12/2011 | Kitamura | B62M 25/08 701/1 |
| 2012/0221205 | A1 * | 8/2012 | Ichida | B62J 45/20 701/37 |
| 2012/0253601 | A1 * | 10/2012 | Ichida | B62M 25/08 701/1 |
| 2012/0322591 | A1 * | 12/2012 | Kitamura | B62M 9/122 474/80 |
| 2013/0061705 | A1 * | 3/2013 | Jordan | B62M 9/132 74/473.13 |
| 2013/0151073 | A1 * | 6/2013 | Tetsuka | B62M 25/04 701/1 |
| 2013/0192405 | A1 * | 8/2013 | Katsura | B62M 9/105 74/473.12 |
| 2013/0194384 | A1 * | 8/2013 | Hannuksela | H04N 19/124 348/43 |
| 2014/0058578 | A1 * | 2/2014 | Tetsuka | B62M 9/132 701/1 |
| 2014/0070930 | A1 * | 3/2014 | Hara | B62J 45/20 340/432 |
| 2014/0087901 | A1 * | 3/2014 | Shipman | B62M 25/08 429/100 |
| 2014/0114538 | A1 * | 4/2014 | Shipman | B62M 9/122 474/80 |
| 2014/0214285 | A1 * | 7/2014 | Wesling | G06F 3/014 701/51 |
| 2014/0290411 | A1 * | 10/2014 | Kuroda | B62M 9/122 74/473.12 |
| 2014/0290412 | A1 * | 10/2014 | Emura | B62M 25/08 74/473.12 |
| 2014/0358386 | A1 * | 12/2014 | Cracco | B62M 9/122 701/51 |
| 2014/0371953 | A1 * | 12/2014 | Miller | B60Q 1/2661 701/2 |
| 2015/0073656 | A1 * | 3/2015 | Takamoto | G06F 9/02 701/1 |
| 2015/0111675 | A1 * | 4/2015 | Shipman | B62M 9/122 474/82 |
| 2015/0329161 | A1 * | 11/2015 | Fujii | B62J 3/14 701/64 |
| 2016/0221640 | A1 * | 8/2016 | Watarai | B62M 9/122 |
| 2016/0311499 | A1 * | 10/2016 | Kasai | B62L 3/02 |
| 2017/0101155 | A1 * | 4/2017 | Tachibana | B62K 25/286 |
| 2017/0101160 | A1 * | 4/2017 | Nishino | B62M 9/135 |
| 2017/0101162 | A1 * | 4/2017 | Tachibana | B62M 25/08 |
| 2017/0113759 | A1 * | 4/2017 | Watarai | B62J 43/30 |

(56) References Cited

U.S. PATENT DOCUMENTS

| | | | |
|---|---|---|---|
| 2017/0120983 A1* | 5/2017 | Komatsu | B62K 25/30 |
| 2017/0203814 A1 | 7/2017 | Kurokawa et al. | |
| 2017/0247082 A1* | 8/2017 | Katsura | B62M 9/132 |
| 2017/0253296 A1* | 9/2017 | Shipman | B62M 9/124 |
| 2018/0001960 A1* | 1/2018 | Pasqua | B62M 25/08 |
| 2018/0043968 A1* | 2/2018 | Sala | B62M 9/122 |
| 2018/0178881 A1* | 6/2018 | Miglioranza | B62M 9/122 |
| 2018/0180640 A1* | 6/2018 | Miglioranza | G01P 3/488 |
| 2018/0237104 A1* | 8/2018 | Pasqua | B62M 9/122 |
| 2018/0257737 A1 | 9/2018 | Komatsu et al. | |
| 2018/0354586 A1* | 12/2018 | Komatsu | B62M 9/1242 |
| 2019/0100280 A1* | 4/2019 | Brown | B62M 1/36 |
| 2020/0361565 A1 | 11/2020 | Komatsu et al. | |

FOREIGN PATENT DOCUMENTS

| | | |
|---|---|---|
| CN | 106976521 | 7/2017 |
| CN | 107571961 | 1/2018 |
| DE | 102016001333 | 9/2016 |
| DE | 102020112683 | 11/2020 |

OTHER PUBLICATIONS

Office Action with Form PTO-892 Notice of References Cited issued by the U.S. Patent and Trademark Office for the U.S. Appl. No. 16/556,241, filed Dec. 7, 2021.

Office Action issued by the U.S. Patent and Trademark Office for the U.S. Appl. No. 16/556,241, Jul. 15, 2022.

Office Action issued by the U.S. Patent and Trademark Office for the U.S. Appl. No. 16/556,241, Mar. 30, 2022.

Office Action issued by the U.S. Patent and Trademark Office for the U.S. Appl. No. 17/993,849, Aug. 29, 2023.

Office Action issued by the U.S. Patent and Trademark Office for the U.S. Appl. No. 17/993,849, Jan. 4, 2024.

Office Action issued by the U.S. Patent and Trademark Office for the U.S. Appl. No. 17/993,849, Mar. 20, 2024.

\* cited by examiner

BICYCLE DERAILLEUR

CROSS-REFERENCE TO RELATED APPLICATIONS

The present application is a continuation application of U.S. patent application Ser. No. 17/993,849 filed Nov. 23, 2022, which is a divisional application of U.S. patent application Ser. No. 16/556,241 filed Aug. 30, 2019, which was issued as U.S. Pat. No. 11,535,339. The contents of these applications are incorporated herein by reference in their entirety.

BACKGROUND OF THE INVENTION

Field of the Invention

The present invention relates to a bicycle derailleur.

Discussion of the Background

A human-powered vehicle includes a derailleur configured to move a chain relative to a plurality of sprockets.

SUMMARY OF THE INVENTION

In accordance with an aspect of the present invention, a bicycle derailleur includes a base member, a movable member, a linkage structure, a wireless communicator, an electrical connector receiving portion, and a power supply portion. The base member is configured to be attached to a bicycle frame. The movable member is movable with respect to the base member. The linkage structure is connected with the base member and the movable member. The wireless communicator is disposed at at least one of the base member, the movable member and the linkage member. The electrical connector receiving portion is configured to receive a connector. The power supply portion is configured to receive electricity from a battery disposed at a location apart from the bicycle derailleur. The electrical connector receiving portion is configured to be electrically connected to the power supply portion. The battery is configured to be charged with electricity through the electrical connector receiving portion and the power supply portion.

In accordance with another aspect of the present invention, a bicycle derailleur includes a base member, a movable member, a linkage structure, a wireless communicator, an electrical connector receiving portion, and a battery. The base member is configured to be attached to a bicycle frame. The movable member is movable with respect to the base member. The linkage structure is connected with the base member and the moveable member. The wireless communicator is disposed at at least one of the base member, the movable member and the linkage structure. The electrical connector receiving portion is configured to receive a connector. The battery is disposed at the base member. The electrical connector receiving portion is configured to be electrically connected to the battery. The battery is configured to be charged with electricity through the electrical connector receiving portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
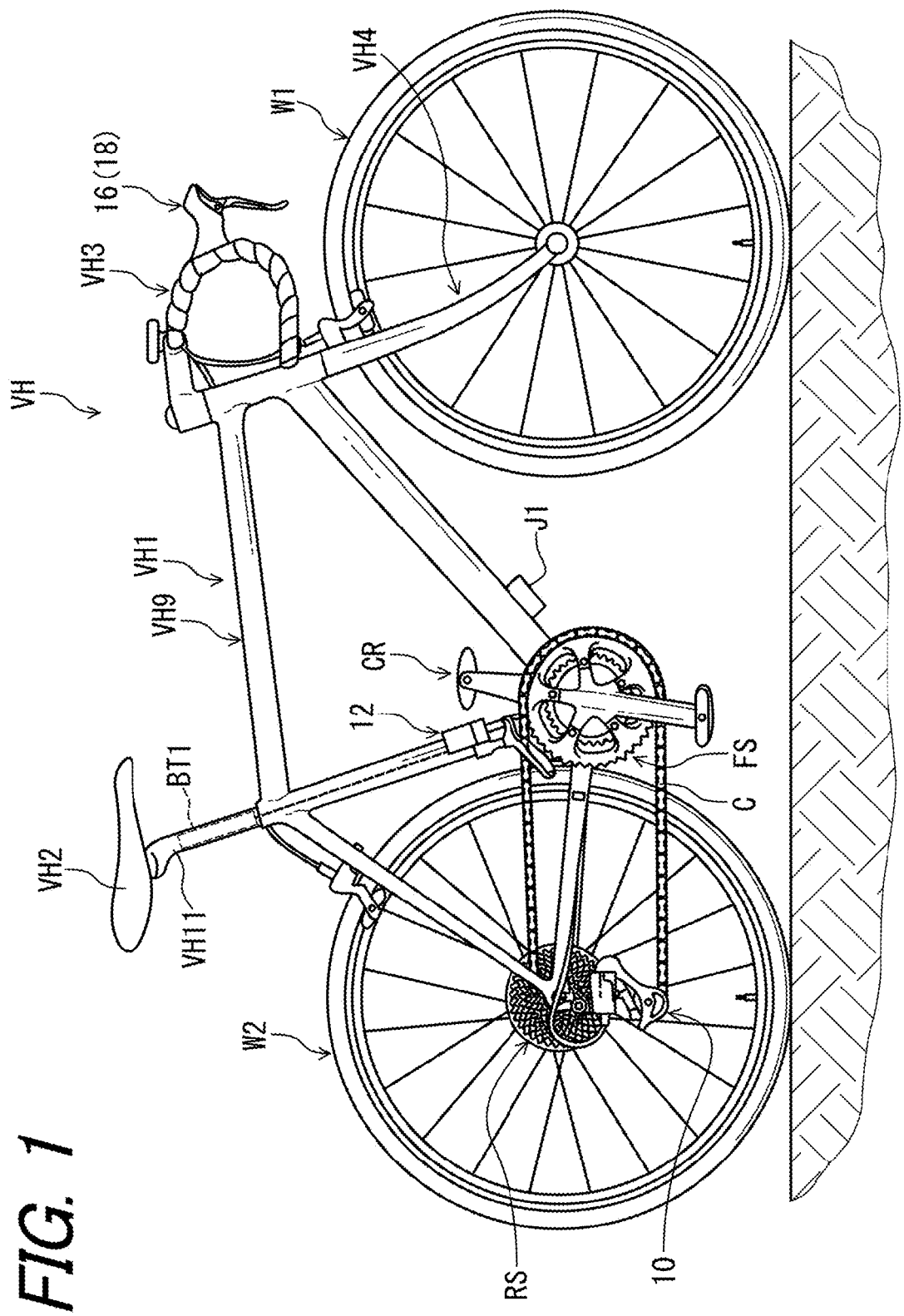
FIG. 1 is a side elevational view of a human-powered vehicle including a bicycle derailleur in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes a bicycle derailleur 10 in accordance with a first embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. However, the human-powered vehicle VH can have an arbitrary size. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the bicycle derailleur 10 can be applied to mountain bikes or any type of human-powered vehicles.

The human-powered vehicle VH further includes a vehicle body VH1, a saddle VH2, a handlebar VH3, a front fork VH4, a front wheel W1, and a rear wheel W2. The front fork VH4 is rotatably mounted to a bicycle frame VH9 of the vehicle body VH1. The handlebar VH3 is secured to the front fork VH4. The front wheel W1 is rotatably coupled to the front fork VH4. The rear wheel W2 is rotatably coupled to the vehicle body VH1.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle VH2 or a seat) in the human-powered vehicle VH with facing the handlebar VH3. Accordingly, these terms, as utilized to describe the bicycle derailleur 10 or other components, should be interpreted relative to the human-powered vehicle VH equipped with the bicycle derailleur 10 as used in an upright riding position on a horizontal surface.

The human-powered vehicle VH includes a crank CR, a front sprocket assembly FS, a rear sprocket assembly RS, a chain C, a bicycle derailleur 12, an electric component RD, an electric component FD, and a battery BT1. The front sprocket assembly FS is secured to the crank CR. The rear sprocket assembly RS is rotatably mounted to the vehicle body VH1. The chain C is engaged with the front sprocket assembly FS and the rear sprocket assembly RS. The bicycle derailleur 10 is mounted to the vehicle body VH1 and is configured to shift the chain C relative to the rear sprocket assembly RS to change a gear position. Each of the electric components RD and FD includes a gear changing device such as a derailleur. The bicycle derailleur 12 is mounted to the vehicle body VH1 and is configured to shift the chain C relative to the front sprocket assembly FS to change a gear position. In this embodiment, the battery BT1 is provided in a seatpost VH11 of the vehicle body VH1. However, the location of the battery BT1 is not limited to this embodiment. The battery BT1 can be mounted to other portions such as a top tube and a down tube of the vehicle body VH1.

Figure 2:
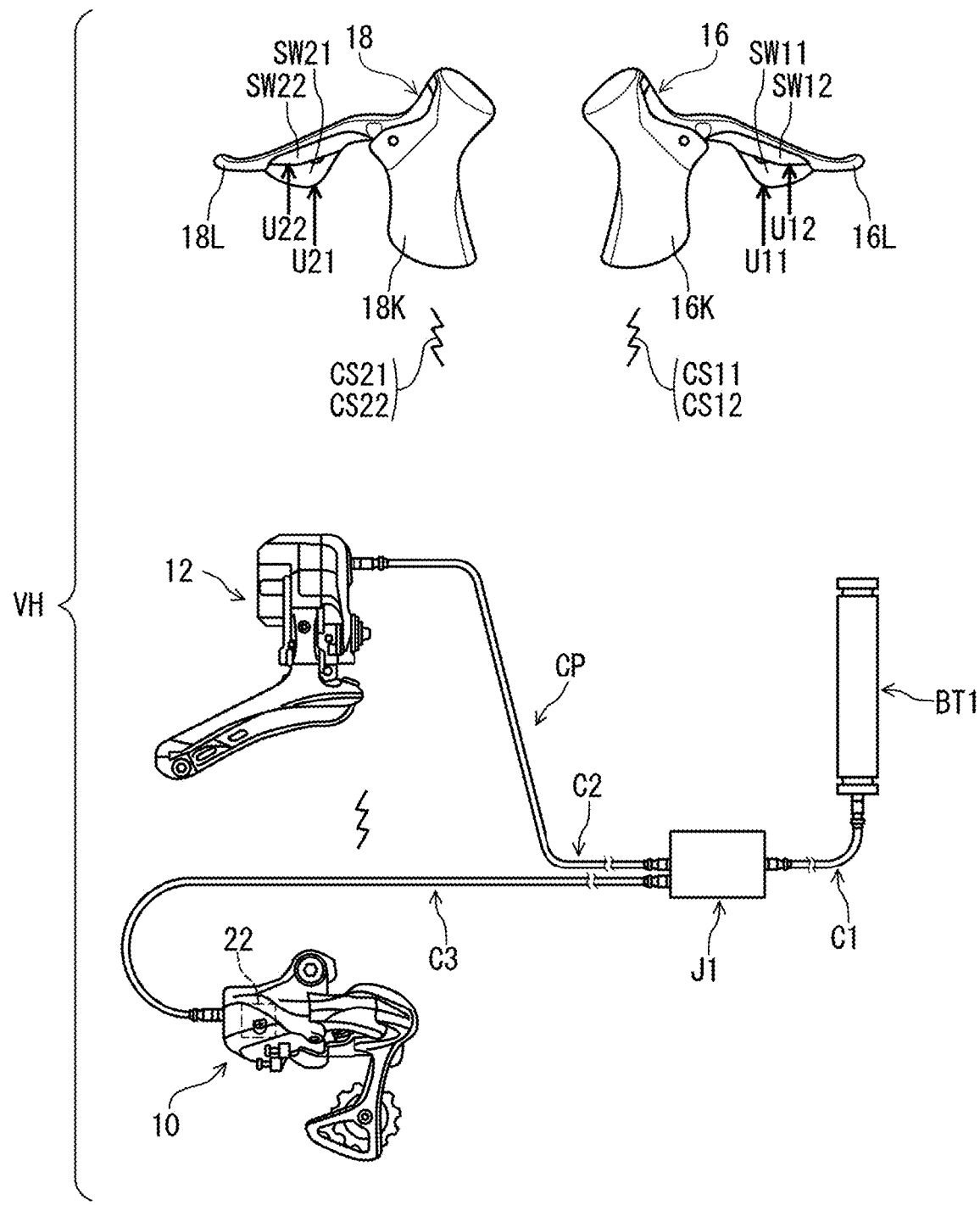
FIG. 2 is a schematic diagram of the human-powered vehicle illustrated in FIG. 1.

As seen in FIG. 2, the human-powered vehicle VH includes an electric communication path CP. The battery BT1 is electrically connected to the bicycle derailleur 10 and the bicycle derailleur 12 with the electric communication path CP to supply electricity to the bicycle derailleur 10 and the bicycle derailleur 12.

The electric communication path CP includes a junction J1 and electric wires C1 to C3. Each of the electric wires C1 to C3 includes electric connectors at both ends thereof. The junction J1 is electrically connected to the battery BT1 with the electric wire C1. The junction J1 is electrically connected to the bicycle derailleur 12 with the electric wire C2. The junction J1 is electrically connected to the bicycle derailleur 10 with the electric wire C3.

The human-powered vehicle VH comprises a first operating device 16 and a second operating device 18. The second operating device 18 is a separate device from the first operating device 16. The first operating device 16 is mounted to a right part of the handlebar VH3. The second operating device 18 is mounted to a left part of the handlebar VH3. However, the locations of the first operating device 16 and the second operating device 18 are not limited to this embodiment. The second operating device 18 can be integrally provided with the first operating device 16 as a single device.

The first operating device 16 is configured to receive a first user input U11 and a first additional user input U12. The first operating device 16 is configured to output a first control signal CS11 in response to the first user input U11. The first operating device 16 is configured to output a first additional control signal CS12 in response to the first additional user input U12.

The first operating device 16 includes a first electrical switch SW11 and a first additional electrical switch SW12. The first electrical switch SW11 is configured to receive the first user input U11. The first additional electrical switch SW12 is configured to receive the first additional user input U12.

Each of the first electrical switch SW11 and the first additional electrical switch SW12 includes a normally open switch. Examples of the first electrical switch SW11 and the first additional electrical switch SW12 includes a push-button switch and a lever switch. However, the structures of the first electrical switch SW11 and the first additional electrical switch SW12 are not limited to this embodiment. The first operating device 16 can include another structure such as a touch panel instead of or in additional to the first electrical switch SW11 and/or the first additional electrical switch SW12.

The first operating device 16 includes a first base member 16K and a first operating member 16L. The first operating member 16L is movably coupled to the first base member 16K. The first electrical switch SW11 and the first additional electrical switch SW12 are mounted to the first operating member 16L. However, the locations of the electrical switches SW11 and SW12 are not limited to this embodiment.

The second operating device 18 is configured to receive a second user input U21 and a second additional user input U22. The second operating device 18 is configured to output a second control signal CS21 in response to the second user input U21. The second operating device 18 is configured to output a second additional control signal CS22 in response to the second additional user input U22.

The second operating device 18 includes a second electrical switch SW21 and a second additional electrical switch SW22. The second electrical switch SW21 is configured to receive the second user input U21. The second additional electrical switch SW22 is configured to receive the second additional user input U22.

Each of the second electrical switch SW21 and the second additional electrical switch SW22 includes a normally open switch. Examples of the second electrical switch SW21 and the second additional electrical switch SW22 includes a push-button switch and a lever switch. However, the structures of the second electrical switch SW21 and the second additional electrical switch SW22 are not limited to this embodiment. The second operating device 18 can include another structure such as a touch panel instead of or in additional to the second electrical switch SW21 and/or the second additional electrical switch SW22.

The second operating device 18 includes a second base member 18K and a second operating member 18L. The second operating member 18L is movably coupled to the second base member 18K. The second electrical switch SW21 and the second additional electrical switch SW22 are mounted to the second operating member 18L. However, the locations of the electrical switches SW21 and SW22 are not limited to this embodiment.

In this embodiment, the first user input U11 and the first control signal CS11 indicate upshifting of the bicycle derailleur 10. The first additional user input U12 and the first additional control signal CS12 indicate downshifting of the bicycle derailleur 10. The second user input U21 and the second control signal CS21 indicate upshifting of the bicycle derailleur 12. The second additional user input U22 and the second additional control signal CS22 indicate downshifting of the bicycle derailleur 12.

Figure 3:
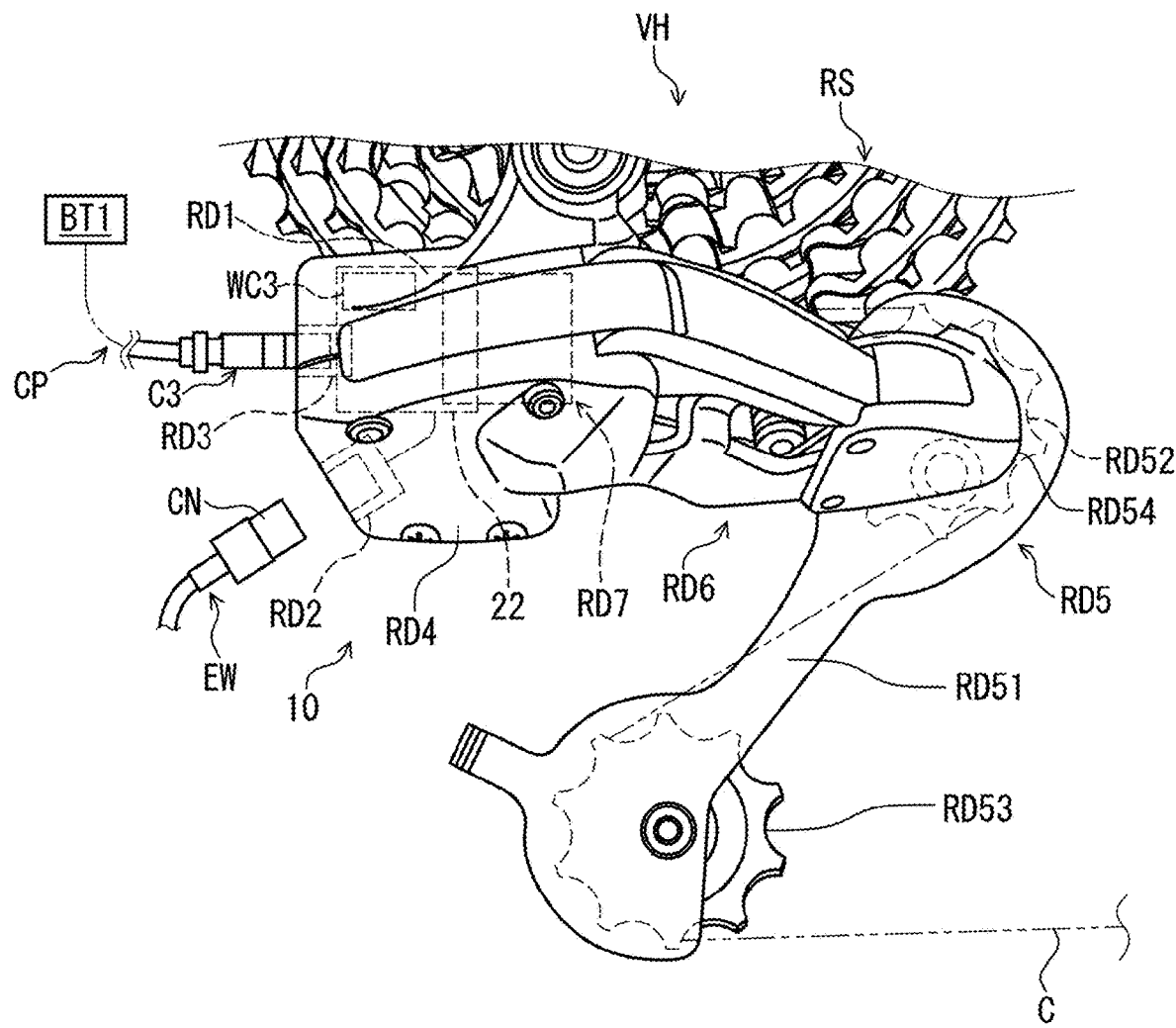
FIG. 3 is a side elevational view of the bicycle derailleur of the human-powered vehicle illustrated in FIG. 1.

As seen in FIG. 3, the bicycle derailleur 10 comprises a unit mounting portion RD1, a wireless communicator WC3, an electrical connector receiving portion RD2, and a power supply portion RD3. The bicycle derailleur 10 further comprises a base member RD4, a movable member RD5, and a linkage structure RD6. The base member RD4 is configured to be attached to the bicycle frame VH9. The movable member RD5 is movable with respect to the base member RD4. The linkage structure RD6 is connected with the base member RD4 and the movable member RD5. The linkage structure RD6 couples movably the movable member RD5 to the base member RD4. The movable member RD5 is configured to guide the chain relative to the rear sprocket assembly. The movable member RD5 includes a chain guide plate RD51, a guide pulley RD52, a tension pulley RD53, and a movable body RD54. The movable body RD54 is coupled to the linkage structure RD6. The chain guide plate RD51 is pivotally coupled to the movable body RD54. The guide pulley RD52 and the tension pulley RD53 are rotatably coupled to the chain guide plate RD51. The guide pulley RD52 and the tension pulley RD53 are configured to be engaged with the chain C.

The unit mounting portion RD1 is positioned at one of the base member RD4, the movable member RD5, and the linkage structure RD6. In this embodiment, the unit mounting portion RD1 is positioned at the base member RD4. However, the location of the unit mounting portion RD1 is not limited to this embodiment. The unit mounting portion RD1 can be positioned at the movable member RD5, the linkage structure RD6, or other portions in the bicycle derailleur 10.

Figure 4:
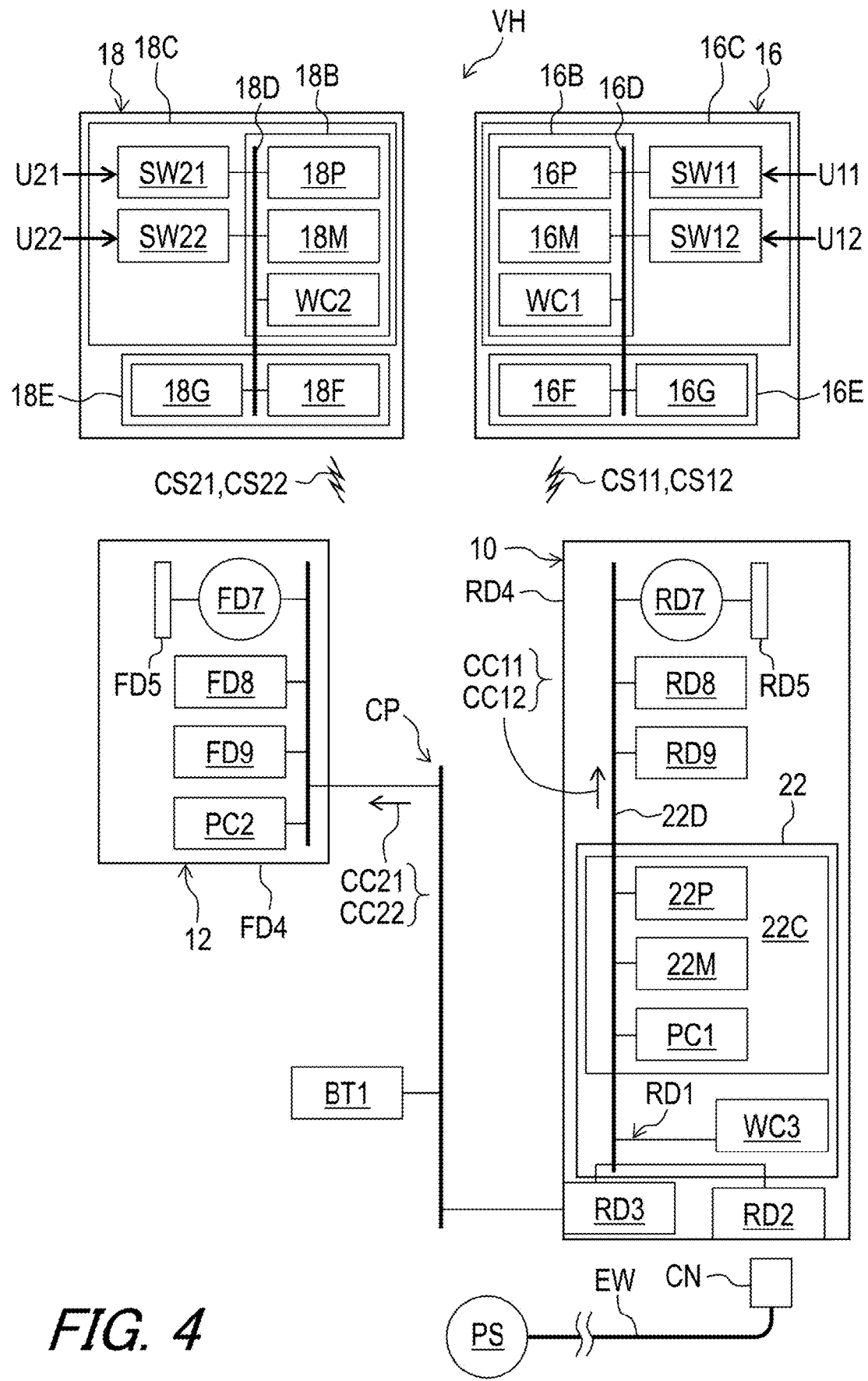
FIG. 4 is a schematic block diagram of the human-powered vehicle illustrated in FIG. 1.

As seen in FIG. 4, the wireless communicator WC3 is configured to communicate with the first operating device 16 and the second operating device 18. The wireless communicator WC3 is configured to wirelessly receive the first control signal CS11, the first additional control signal CS12, the second control signal CS21, and the second additional control signal CS22.

As seen in FIG. 3, the wireless communicator WC3 is disposed at the unit mounting portion RD1. In this embodiment, the wireless communicator WC3 is non-detachably disposed at the unit mounting portion RD1. The term "non-detachably," as used herein, encompasses a structure in which an element is not detachable from another element without substantial damage. In other words, the wireless communicator WC3 is detachable from the unit mounting portion RD1 with substantial damage.

The unit mounting portion RD1 includes an electric conductor of a circuit board. The wireless communicator WC3 is electrically connected to the electrical conductor by soldering, for example. However, the wireless communicator WC3 can be detachably disposed at the unit mounting portion RD1 without substantial damage. In this embodiment, the unit mounting portion RD1 and the wireless communicator WC3 are provided in the base member RD4. However, the locations of the unit mounting portion RD1 and the wireless communicator WC3 are not limited to this embodiment. The term "detachably," as used herein, encompasses a structure in which an element is repeatedly detachable from and attachable to another element without substantial damage.

The power supply portion RD3 is configured to receive electricity from the battery BT1 disposed at a location apart from the bicycle derailleur 10. The "location apart from the bicycle derailleur 10" includes a location other than the bicycle derailleur 10 in the human-powered vehicle VH. In this embodiment, the battery BT1 is provided in the vehicle body VH1 (see e.g., FIG. 1) and is not directly secured to the bicycle derailleur 10.

The power supply portion RD3 is electrically connected to the battery BT1 via the electric wire C3. The power supply portion RD3 is electrically connected to the unit mounting portion RD1. The power supply portion RD3 is electrically connected to the wireless communicator WC3 through the unit mounting portion RD1. The electric wire C3 is configured to be detachably connected to the power supply portion RD3 without substantial damage. The battery BT1 includes a rechargeable battery.

Figure 5:
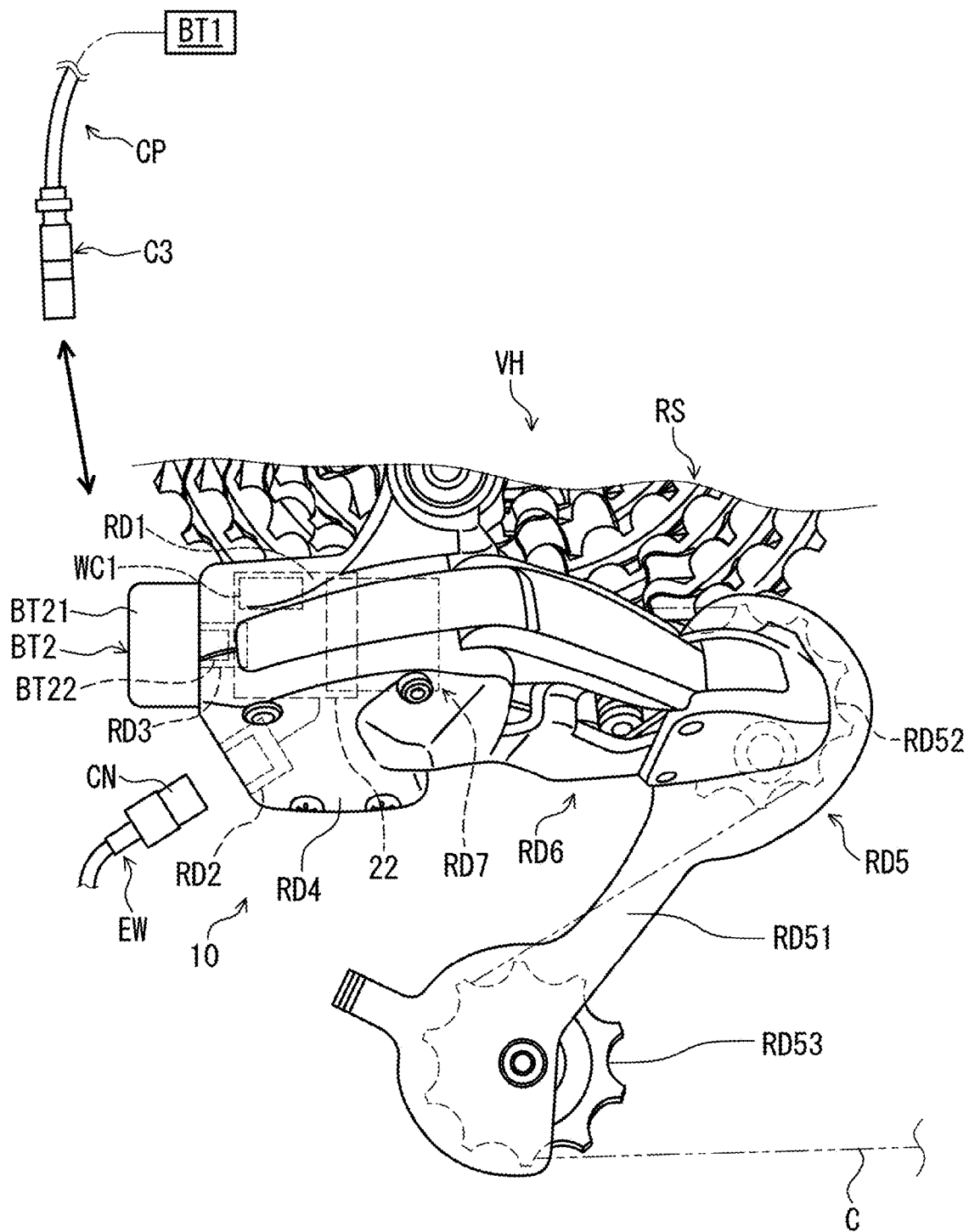
FIG. 5 is another side elevational view of the bicycle derailleur illustrated in FIG. 3.

As seen in FIG. 5, the power supply portion RD3 is configured to receive an additional battery BT2 that is different from the battery BT1. The power supply portion RD3 is configured to directly receive the additional battery BT2. The additional battery BT2 includes a battery body BT21 and a battery connector BT22. The battery connector BT22 is configured to electrically connect the battery body BT21 to the power supply portion RD3. The battery connector BT22 protrudes from the battery body BT21. The additional battery BT2 is separately provided from the battery BT1 (see e.g., FIG. 1). Thus, the battery BT1 can be replaced with the additional battery BT2. Examples of the additional battery BT2 include a rechargeable battery. The additional battery BT2 can supply electricity to the power supply portion RD3 if electricity is not supplied from the battery BT1 to the power supply portion RD3 due to the remaining level of the battery BT1 is too low or zero and/or due to the disconnection of the electric communication path CP.

As seen in FIG. 3, the electrical connector receiving portion RD2 is configured to receive a connector CN. The connector CN is configured to be detachably connected to the electrical connector receiving portion RD2 without substantial damage. The electrical connector receiving portion RD2 is electrically connected to the power supply portion RD3. Examples of the electrical connector receiving portion RD2 include a charging port and a universal serial bus (USB) port. The connector CN is provided at an end of an electric wire EW. The battery BT1 is charged with electricity through the electric wire EW, the connector CN, the electrical connector receiving portion RD2, and the power supply portion RD3 in a state where the battery BT1 is electrically connected to the electrical connector receiving portion RD2 with the electric wire C3. As seen in FIG. 5, the additional battery BT2 is charged with electricity through the electric wire EW, the connector CN, the electrical connector receiving portion RD2, and the power supply portion RD3 in a state where the additional battery BT2 is electrically connected to the electrical connector receiving portion RD2.

In this embodiment, the electrical connector receiving portion RD2 includes a data communication interface such as the USB port. The connector CN includes a USB connector. In other words, the electrical connector receiving portion RD2 includes a charging port such as the USB port. The electric wire EW electrically connects the connector CN to a power supply PS such as a direct current (DC) power supply or an alternative current (AC) power supply. The battery BT1 or the additional battery BT2 is charged with electricity through the electrical connector receiving portion RD2 and the power supply portion RD3.

In this embodiment, the electrical connector receiving portion RD2 is positioned at the base member RD4. However, the location of the electrical connector receiving portion RD2 is not limited to this embodiment. The electrical connector receiving portion RD2 can be positioned at the movable member RD5, the linkage structure RD6, or other portions in the bicycle derailleur 10.

As seen in FIG. 3, the bicycle derailleur 10 further comprises a motor unit RD7 configured to be supplied with electrical power from the battery BT1. The motor unit RD7 is coupled to the movable member RD5 to move the movable member RD5 relative to the base member RD4. The motor unit RD7 is electrically connected to the power supply portion RD3. The motor unit RD7 is configured to operate using electricity supplied from the battery BT1 or the additional battery BT2 through the power supply portion RD3.

In this embodiment, the motor unit RD7 is disposed at the unit mounting portion RD1. The motor unit RD7 is electrically connected to the unit mounting portion RD1. However, the location of the motor unit RD7 is not limited to this embodiment. The motor unit RD7 can be positioned at the movable member RD5, the linkage structure RD6, or other portions in the bicycle derailleur 10. The motor unit RD7 includes a motor and a reduction gear structure. Examples of the motor of the motor unit RD7 include a direct current motor and a stepper motor. The motor unit RD7 may include wireless communicator WC1.

As seen in FIG. 4, the bicycle derailleur 10 includes a position sensor RD8 and a motor driver RD9. The motor unit RD7 is electrically connected to the position sensor RD8 and the motor driver RD9. The motor unit RD7 includes a rotational shaft operatively coupled to the movable member RD5. In this embodiment, the rotational shaft of the motor unit RD7 is coupled to the linkage structure RD6. The position sensor RD8 is configured to sense a current gear position of the bicycle derailleur 10. Examples of the position sensor RD8 include a potentiometer and a rotary encoder. The position sensor RD8 is configured to sense an absolute rotational position of the rotational shaft of the motor unit RD7 as the current gear position of the bicycle derailleur 10. The motor driver RD9 is configured to control the motor unit RD7 based on the current gear position sensed by the position sensor RD8.

Figure 6:
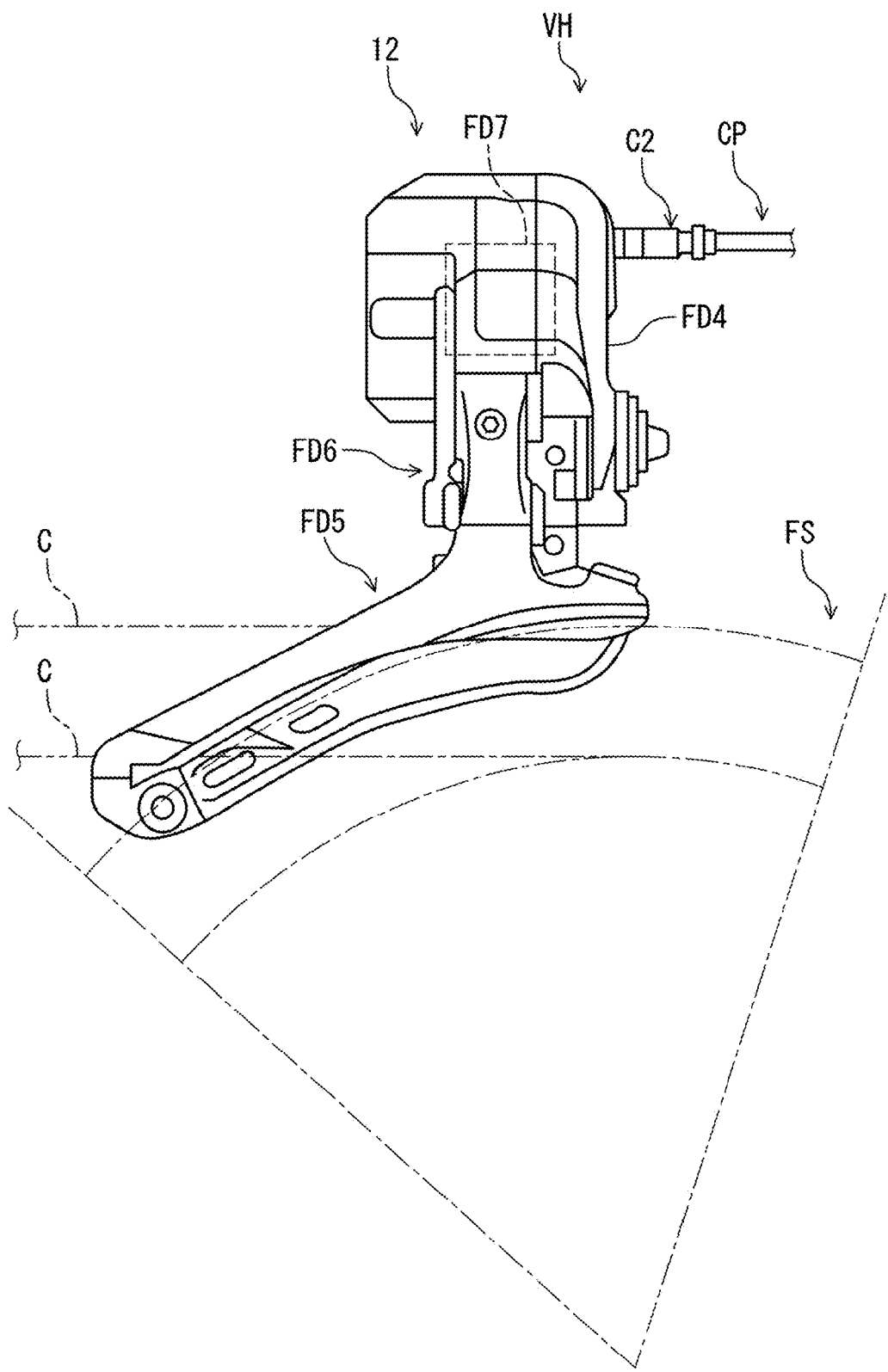
FIG. 6 is a side elevational view of another bicycle derailleur of the human-powered vehicle illustrated in FIG. 1.

As seen in FIGS. 4 and 6, the bicycle derailleur 12 comprise a base member FD4, a movable member FD5, a linkage structure FD6, a motor unit FD7, a position sensor FD8, and a motor driver FD9. The base member FD4, the movable member FD5, the linkage structure FD6, the motor unit FD7, the position sensor FD8, and the motor driver FD9 have substantially the same structures as the structures of the base member RD4, the movable member RD5, the linkage structure RD6, the motor unit RD7, the position sensor RD8, and the motor driver RD9 of the bicycle derailleur 10. Thus, they will not be described in detail here for sake of brevity.

As seen in FIG. 4, the human-powered vehicle VH comprises a controller 22. In this embodiment, the controller 22 is configured to be mounted to the bicycle derailleur 10. However, the controller 22 can be mounted to another device such as the first operating device 16, the second operating device 18, the bicycle derailleur 12, the battery BT1, and the junction J1.

The controller 22 is configured to be electrically connected to the bicycle derailleur 10, the bicycle derailleur 12, and the battery BT1 with the electric communication path CP. The controller 22 is configured to be communicate with the first operating device 16 and the second operating device 18. The controller 22 is configured to control the bicycle derailleur 10 based on the first control signal CS11 and the first additional control signal CS12. The controller 22 is configured to control the bicycle derailleur 12 based on the second control signal CS21 and the second additional control signal CS22.

In this embodiment, the controller 22 is configured to control the bicycle derailleur 10 to upshift in response to the first control signal CS11. The controller 22 is configured to control the bicycle derailleur 10 to downshift in response to the first additional control signal CS12. The controller 22 is configured to control the bicycle derailleur 12 to upshift in response to the second control signal CS21. The controller 22 is configured to control the bicycle derailleur 12 to downshift in response to the second additional control signal CS22.

The controller 22 is configured to be electrically connected to the unit mounting portion RD1, the wireless communicator WC3, the electrical connector receiving portion RD2, the power supply portion RD3, the motor unit RD7, the position sensor RD8, and the motor driver RD9.

The controller 22 includes a processor 22P, a memory 22M, a circuit board 22C, and a system bus 22D. The processor 22P and the memory 22M are electrically mounted on the circuit board 22C. The processor 22P includes a central processing unit (CPU) and a memory controller. The memory 22M is electrically connected to the processor 22P. The memory 22M includes a read only memory (ROM) and a random-access memory (RAM). The memory 22M includes storage areas each having an address in the ROM and the RAM. The processor 22P is configured to control the memory 22M to store data in the storage areas of the memory 22M and reads data from the storage areas of the memory 22M. The memory 22M (e.g., the ROM) stores a program. The program is read into the processor 22P, and thereby the configuration and/or algorithm of the controller 22 is performed.

The wireless communicator WC3 is electrically mounted on the circuit board 22C. The wireless communicator WC3 is electrically connected to the processor 22P and the memory 22M with the circuit board 22C and the system bus 22D. The wireless communicator WC3 includes a signal transmitting circuit, a signal receiving circuit, and an antenna. Thus, the wireless communicator WC3 can also be referred to as a wireless communication circuit WC3.

The wireless communicator WC3 is configured to superimpose digital signals on carrier wave using a predetermined wireless communication protocol to wirelessly transmit a control signal. In this embodiment, the wireless communicator WC3 is configured to encrypt a control signal using a cryptographic key to generate encrypted wireless signals.

The wireless communicator WC3 is configured to receives a wireless signal via the antenna. In this embodiment, the wireless communicator WC3 is configured to decode the wireless signal to recognize the first control signal CS11, the first additional control signal CS12, the second control signal CS21, and/or the second additional control signal CS22 which are wirelessly transmitted from the first wireless communicator WC1 and/or the second wireless communicator WC2. The wireless communicator WC3 is configured to decrypt the wireless signal using the cryptographic key.

As seen in FIG. 4, the first communicator 16B includes a first wireless communicator WC1 configured to wirelessly transmit the first control signal CS11. The first wireless communicator WC1 is configured to wirelessly receive information. The first wireless communicator WC1 is configured to be electrically connected to the first user interface 16A. The first wireless communicator WC1 is configured to be electrically connected to the first electrical switch SW11 to transmit the first control signal CS11 in response to the first user input U11. The first wireless communicator WC1 is configured to be electrically connected to the first additional electrical switch SW12 to transmit the first additional control signal CS12 in response to the first additional user input U12.

The first communicator 16B includes a first processor 16P, a first memory 16M, a first circuit board 16C, and a first system bus 16D. The first processor 16P and the first memory 16M are electrically mounted on the first circuit board 16C. The first processor 16P includes a CPU and a memory controller. The first memory 16M is electrically connected to the first processor 16P. The first memory 16M includes a ROM and a RAM. The first memory 16M includes storage areas each having an address in the ROM and the RAM. The first processor 16P is configured to control the first memory 16M to store data in the storage areas of the first memory 16M and reads data from the storage areas of the first memory 16M. The first circuit board 16C, the first electrical switch SW11, and the first additional electrical switch SW12 are electrically connected to the first system bus 16D. The first electrical switch SW11 and the first additional electrical switch SW12 are electrically connected to the first processor 16P and the first memory 16M with the first circuit board 16C and the first system bus 16D. The first memory 16M (e.g., the ROM) stores a program. The program is read into the first processor 16P, and thereby the configuration and/or algorithm of the first communicator 16B is performed.

The first wireless communicator WC1 is electrically mounted on the first circuit board 16C. The first wireless communicator WC1 is electrically connected to the first processor 16P and the first memory 16M with the first circuit board 16C and the first system bus 16D. The first wireless communicator WC1 includes a signal transmitting circuit, a signal receiving circuit, and an antenna. Thus, the first wireless communicator WC1 can also be referred to as a first wireless communication circuit WC1.

The first wireless communicator WC1 is configured to superimpose digital signals such as the first control signal CS11 and the first additional control signal CS12 on carrier wave using a predetermined wireless communication protocol to wirelessly transmit the first control signal CS11 and the first additional control signal CS12. In this embodiment, the first wireless communicator WC1 is configured to encrypt a control signal (e.g., the first control signal CS11 or the first additional control signal CS12) using a cryptographic key to generate encrypted wireless signals.

The first wireless communicator WC1 is configured to receives a wireless signal via the antenna. In this embodiment, the first wireless communicator WC1 is configured to decode the wireless signal to recognize signals and/or information wirelessly transmitted from another wireless communicator. The first wireless communicator WC1 is configured to decrypt the wireless signal using the cryptographic key.

The first operating device 16 includes a first electric power source 16E. The first electric power source 16E is configured to supply electricity to the first communicator 16B. The first electric power source 16E is configured to be electrically connected to the first communicator 16B. In this embodiment, the first electric power source 16E includes a first battery 16F and a first battery holder 16G. The first battery 16F includes a replaceable and/or rechargeable battery. The first battery holder 16G is configured to be electrically connected to the first communicator 16B via the first circuit board 16C and the first system bus 16D. The first battery 16F is configured to be detachably attached to the first battery holder 16G. However, the first electric power source 16E is not limited to this embodiment. For example, the first electric power source 16E can include another component such as a capacitor and an electricity generation element (e.g., a piezoelectric element) instead of or in addition to the first battery 16F and the first battery holder 16G.

As seen in FIG. 4, the second communicator 18B includes a second wireless communicator WC2 configured to wirelessly transmit the second control signal CS21. The second wireless communicator WC2 is configured to wirelessly receive information. The second wireless communicator WC2 is configured to be electrically connected to the second user interface 18A. The second wireless communicator WC2 is configured to be electrically connected to the second electrical switch SW21 to transmit the second control signal CS21 in response to the second user input U21. The second wireless communicator WC2 is configured to be electrically connected to the second additional electrical switch SW22 to transmit the second additional control signal CS22 in response to the second additional user input U22.

The second communicator 18B includes a second processor 18P, a second memory 18M, a second circuit board 18C, and a second system bus 18D. The second processor 18P and the second memory 18M are electrically mounted on the second circuit board 18C. The second processor 18P includes a CPU and a memory controller. The second memory 18M is electrically connected to the second processor 18P. The second memory 18M includes a ROM and a RAM. The second memory 18M includes storage areas each having an address in the ROM and the RAM. The second processor 18P is configured to control the second memory 18M to store data in the storage areas of the second memory 18M and reads data from the storage areas of the second memory 18M. The second circuit board 18C, the second electrical switch SW21, and the second additional electrical switch SW22 are electrically connected to the second system bus 18D. The second electrical switch SW21 and the second additional electrical switch SW22 are electrically connected to the second processor 18P and the second memory 18M with the second circuit board 18C and the second system bus 18D. The second memory 18M (e.g., the ROM) stores a program. The program is read into the second processor 18P, and thereby the configuration and/or algorithm of the second communicator 18B is performed.

The second wireless communicator WC2 is electrically mounted on the second circuit board 18C. The second wireless communicator WC2 is electrically connected to the second processor 18P and the second memory 18M with the second circuit board 18C and the second system bus 18D. The second wireless communicator WC2 includes a signal transmitting circuit, a signal receiving circuit, and an antenna. Thus, the second wireless communicator WC2 can also be referred to as a second wireless communication circuit WC2.

The second wireless communicator WC2 is configured to superimpose digital signals such as the second control signal CS21 and the second additional control signal CS22 on carrier wave using a predetermined wireless communication protocol to wirelessly transmit the second control signal CS21 and the second additional control signal CS22. In this embodiment, the second wireless communicator WC2 is configured to encrypt a control signal (e.g., the second control signal CS21 or the second additional control signal CS22) using a cryptographic key to generate encrypted wireless signals.

The second wireless communicator WC2 is configured to receives a wireless signal via the antenna. In this embodiment, the second wireless communicator WC2 is configured to decode the wireless signal to recognize signals and/or information wirelessly transmitted from another wireless communicator. The second wireless communicator WC2 is configured to decrypt the wireless signal using the cryptographic key.

The second operating device 18 includes a second electric power source 18E. The second electric power source 18E is configured to supply electricity to the second communicator 18B. The second electric power source 18E is configured to be electrically connected to the second communicator 18B. In this embodiment, the second electric power source 18E includes a second battery 18F and a second battery holder 18G. The second battery 18F includes a replaceable and/or rechargeable battery. The second battery holder 18G is configured to be electrically connected to the second communicator 18B via the second circuit board 18C and the second system bus 18D. The second battery 18F is configured to be detachably attached to the second battery holder 18G. However, the second electric power source 18E is not limited to this embodiment. For example, the second electric power source 18E can include another component such as a capacitor and an electricity generation element (e.g., a piezoelectric element) instead of or in addition to the second battery 18F and the second battery holder 18G.

As seen in FIG. 4, the controller 22 is configured to generate a first control command CC11 based on the first control signal CS11. The controller 22 is configured to generate a first additional control command CC12 based on the first additional control signal CS12. The controller 22 is configured to generate a second control command CC21 based on the second control signal CS21. The controller 22 is configured to generate a second additional control command CC22 based on the second additional control signal CS22.

The first control signal CS11, the first additional control signal CS12, the second control signal CS21, and the second additional control signal CS22 are distinguishable from each other. The first control command CC11, the first additional control command CC12, the second control command CC21, and the second additional control command CC22 are distinguishable from each other.

In this embodiment, the first control signal CS11 and the first control command CC11 indicate upshifting of the bicycle derailleur 10. The first additional control signal CS12 and the first additional control command CC12 indicate downshifting of the bicycle derailleur 10. The second control signal CS21 and the second control command CC21 indicate upshifting of the bicycle derailleur 12. The second additional control signal CS22 and the second additional control command CC22 indicate downshifting of the bicycle derailleur 12.

As seen in FIG. 4, the motor driver RD9 is configured to control the motor unit RD7 based on the first control command CC11 and the first additional control command CC12 generated by the controller 22. The motor driver RD9 is configured to control the motor unit RD7 to move the movable member RD5 relative to the base member RD4 by one gear position in an upshift direction based on the first control command CC11 and the current gear position sensed by the position sensor RD8. The motor driver RD9 is configured to control the motor unit RD7 to move the movable member RD5 relative to the base member RD4 by one gear position in a downshift direction based on the first additional control command CC12 and the current gear position sensed by the position sensor RD8.

The motor driver FD9 is configured to control the motor unit FD7 based on the second control command CC21 and the second additional control command CC22 generated by the controller 22. The motor driver FD9 is configured to control the motor unit FD7 to move the movable member FD5 relative to the base member FD4 by one gear position in an upshift direction based on the second control command CC21 and the current gear position sensed by the position sensor FD8. The motor driver FD9 is configured to control the motor unit FD7 to move the movable member FD5 relative to the base member FD4 by one gear position in a downshift direction based on the second additional control command CC22 and the current gear position sensed by the position sensor FD8.

As seen in FIG. 2, the bicycle derailleur 10, the bicycle derailleur 12, the battery BT1, and the controller 22 communicate with each other via the electric communication path CP using power line communication (PLC) technology. More specifically, each of the electric wires C1 to C3 includes a ground line and a voltage line that are detachably connected to a serial bus that is formed by communication interfaces and the junction J1. In this embodiment, the bicycle derailleur 10, the bicycle derailleur 12, the battery BT1, and the controller 22 can all communicate with each other through the voltage line using the PLC technology.

As seen in FIG. 4, the second control command CC21 and the second additional control command CC22 are transmitted from the controller 22 to the bicycle derailleur 12 through the electric communication path CP. However, the bicycle derailleur 12 can include a wireless communicator configured to wirelessly receive the second control signal CS21 and the second additional control signal CS22. In such embodiment, the battery BT1, the electric wires C1 to C3, and the junction J1 can be omitted from the human-powered vehicle VH. Instead, each of the bicycle derailleur 10 and the bicycle derailleur 12 can include a battery.

The PLC technology is used for communicating between electric components. The PLC carries data on a conductor that is also used simultaneously for electric power transmission or electric power distribution to the electric components. In this embodiment, electricity is supplied from the battery BT1 to the bicycle derailleur 10, and the bicycle derailleur 12 via the electric communication path CP. Furthermore, the controller 22 can receive information signals from the bicycle derailleur 10, the bicycle derailleur 12, and the battery BT1 through the electric communication path CP using the PLC.

The PLC uses unique identifying information such as a unique identifier that is assigned to each of the bicycle derailleur 10, the bicycle derailleur 12, and the battery BT1. Each of the electric components RD, FD, and BT1 includes a memory in which the unique identifying information is stored. Based on the unique identifying information, each of the electric components RD, FD, and BT1 is configured to recognize, based on the unique identifying information, information signals which are necessary for itself among information signals transmitted via the electric communication path CP. For example, the controller 22 is configured to recognize information signals transmitted from the bicycle derailleur 10, the bicycle derailleur 12, and the battery BT1 with the electric communication path CP. Instead of using the PLC technology, however, separate signal wires can be provided for transmitting data in addition to the ground wire and the voltage wire if needed and/or desired.

The controller 22 includes a PLC controller PC1. The PLC controller PC1 is electrically mounted on the circuit board 22C. The PLC controller PC1 is connected to the electric communication path CP, the bicycle derailleur 10, and the system bus 22D. The PLC controller PC is configured to separate input signals to a power source voltage and control signals. The PLC controller PC1 is configured to regulate the power source voltage to a level at which the controller 22 and the bicycle derailleur 10 can properly operate. The PLC controller PC1 is further configured to superimpose output signals such as the second control command CC21 and the second additional control command CC22 on the power source voltage applied to the electric communication path CP from the battery BT1.

Each of the bicycle derailleur 12 and the battery BT1 includes a PLC controller having substantially the same structure as the structure of the PLC controller PC1. The bicycle derailleur 12 includes a PLC controller PC2. Thus, they will not be described in detail here for the sake of brevity.

Figure 7:
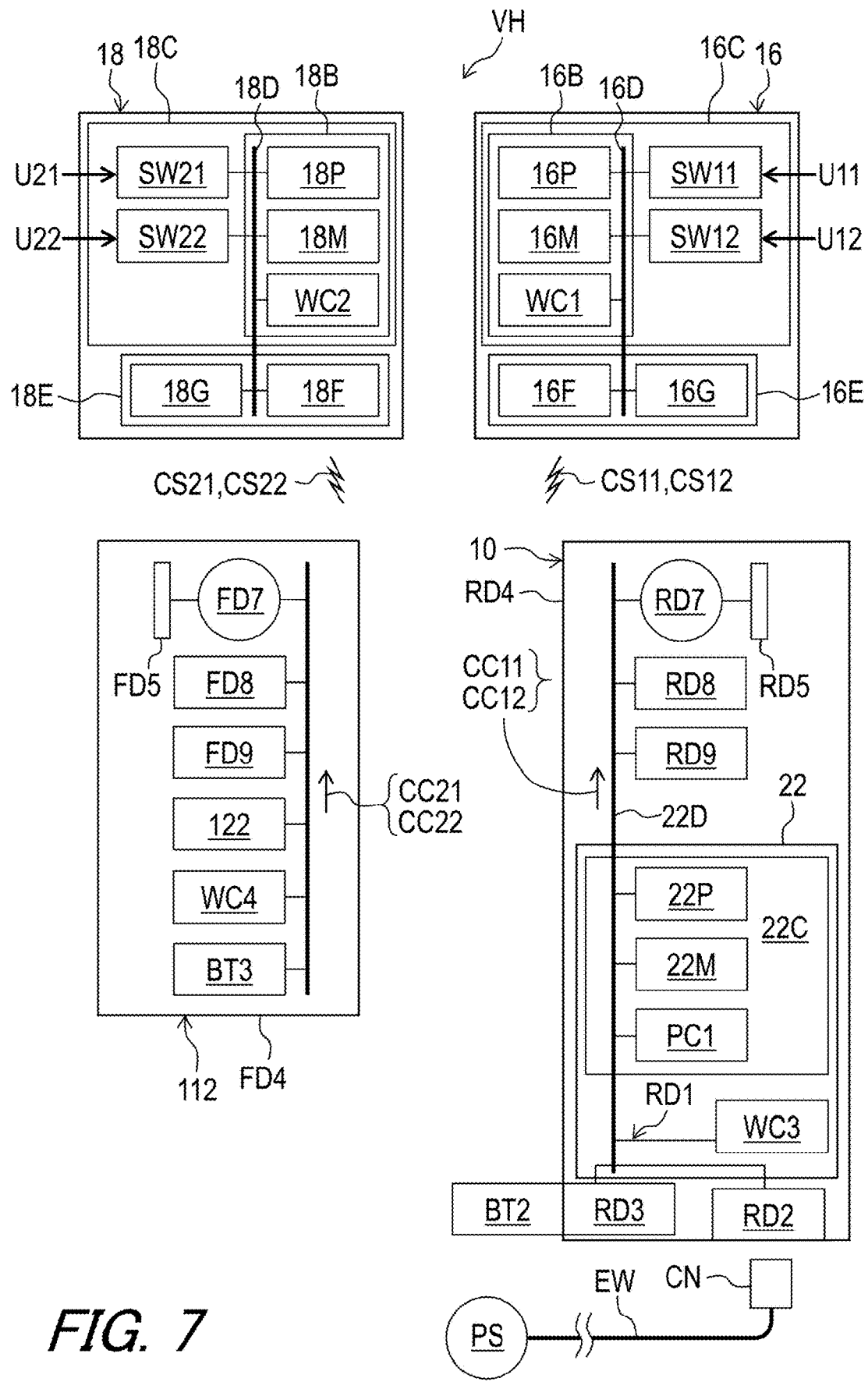
FIG. 7 is another schematic block diagram of the human-powered vehicle illustrated in FIG. 1.

As seen in FIG. 7, in a case where the additional battery BT2 is attached to the power supply portion RD3, the battery BT1 and the electric communication path CP are omitted from the human-powered vehicle VH. The human-powered vehicle VH includes a bicycle derailleur 112 instead of the bicycle derailleur 12. The bicycle derailleur 112 has substantially the same structure as the structure of the bicycle derailleur 12 illustrated in FIG. 4. The bicycle derailleur 112 includes a wireless communicator WC4, a controller 122, and a battery BT3. The wireless communicator WC4 is configured to wirelessly receive the second control signal CS21 and the second additional control signal CS22. The controller 122 has substantially the same structure as the structure of the controller 22. The controller 122 is configured to generate the second control command CC21 in response to the second control signal CS21. The controller 122 is configured to generate the second additional control command CC22 in response to the second additional control signal CS22. The battery BT3 is configured to supply electricity to the wireless communicator WC4, the motor unit FD7, the position sensor FD8, and the motor driver FD9.

Second Embodiment

A bicycle derailleur 210 in accordance with a second embodiment will be described below referring to FIGS. 8 and 9. The bicycle derailleur 210 has the same structure and/or configuration as those of the bicycle derailleur 10 except for the unit mounting portion RD1 and the wireless communicator WC3. Thus, elements having substantially the same function as those in the first embodiment will be numbered the same here and will not be described and/or illustrated again in detail here for the sake of brevity.

Figure 8:
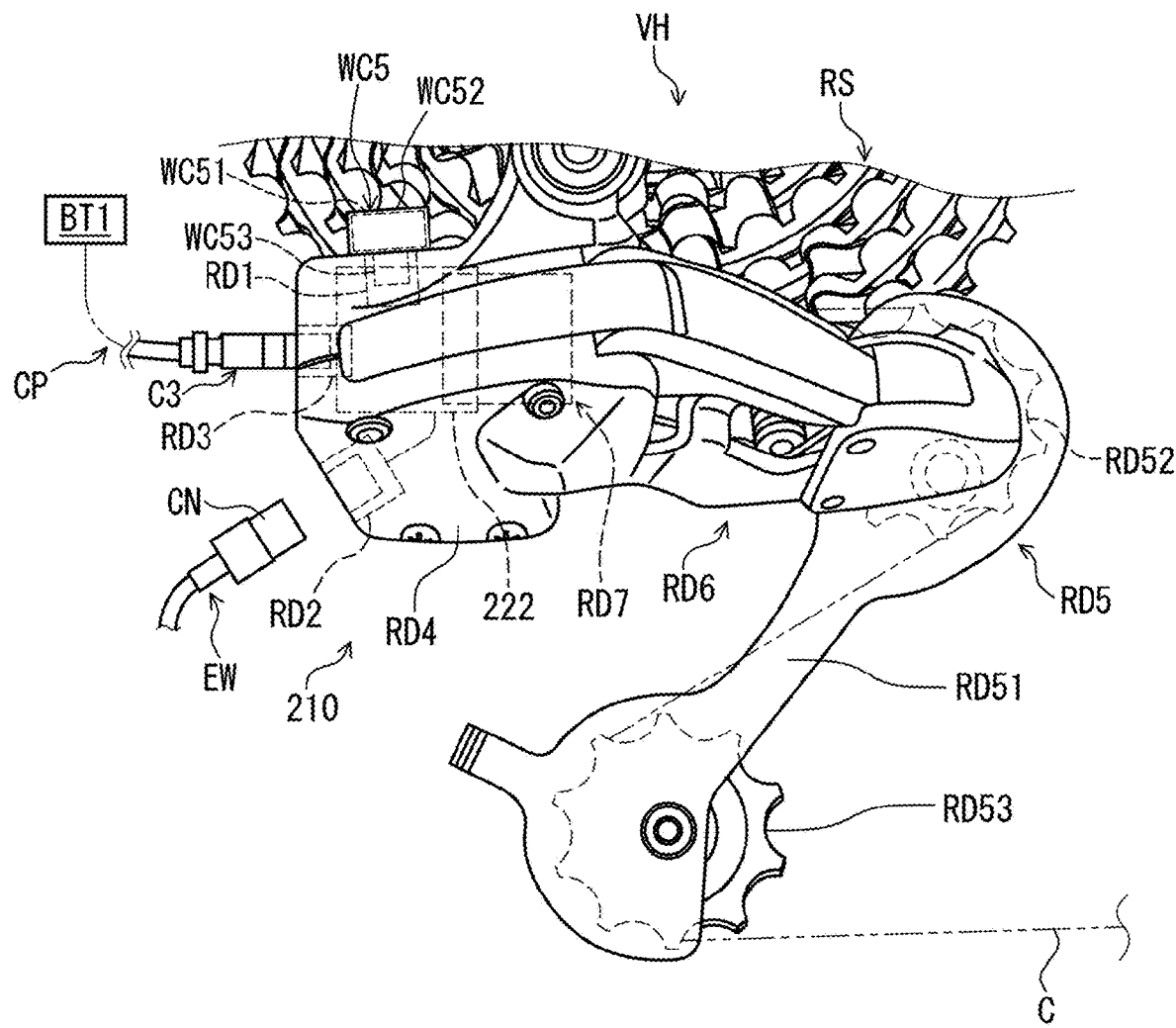
FIG. 8 is a side elevational view of a bicycle derailleur in accordance with a second embodiment.

As seen in FIG. 8, the bicycle derailleur 210 comprises a unit mounting portion RD21, a wireless communicator WC5, the electrical connector receiving portion RD2, and the power supply portion RD3. The wireless communicator WC5 is disposed at the unit mounting portion RD21. The electrical connector receiving portion RD2 is configured to receive the connector CN. The power supply portion RD3 is configured to receive electricity from the battery BT1 disposed at a location apart from the bicycle derailleur 210.

The unit mounting portion RD21 is positioned at one of the base member RD4, the movable member RD5, and the linkage structure RD6. In this embodiment, the unit mounting portion RD21 is positioned at the base member RD4. However, the location of the unit mounting portion RD21 is not limited to this embodiment. The unit mounting portion RD21 can be positioned at the movable member RD5, the linkage structure RD6, or other portions in the bicycle derailleur 210.

The wireless communicator WC5 is configured to communicate with the first operating device 16 and the second operating device 18. The wireless communicator WC5 is configured to wirelessly receive the first control signal CS11, the first additional control signal CS12, the second control signal CS21, and the second additional control signal CS22.

The wireless communicator WC5 is disposed at the unit mounting portion RD21. In this embodiment, the wireless communicator WC5 is detachably disposed at the unit mounting portion RD21. The wireless communicator WC5 is detachably disposed at the unit mounting portion RD21 without substantial damage.

The wireless communicator WC5 includes a wireless communication circuit WC51, a housing WC52, and a communication connector WC53. The wireless communication circuit WC51 has substantially the same structure as the structure of the wireless communicator WC3 of the first embodiment.

The wireless communication circuit WC51 is provided in the housing WC52. The communication connector WC53 is electrically connected to the wireless communication circuit WC51. The communication connector WC53 extends from the housing WC52. The communication connector WC53 is detachably connected to the unit mounting portion RD21. The unit mounting portion RD21 includes a connection port RD21A. The communication connector WC53 is configured to be detachably provided in the connection port RD21A.

Figure 9:
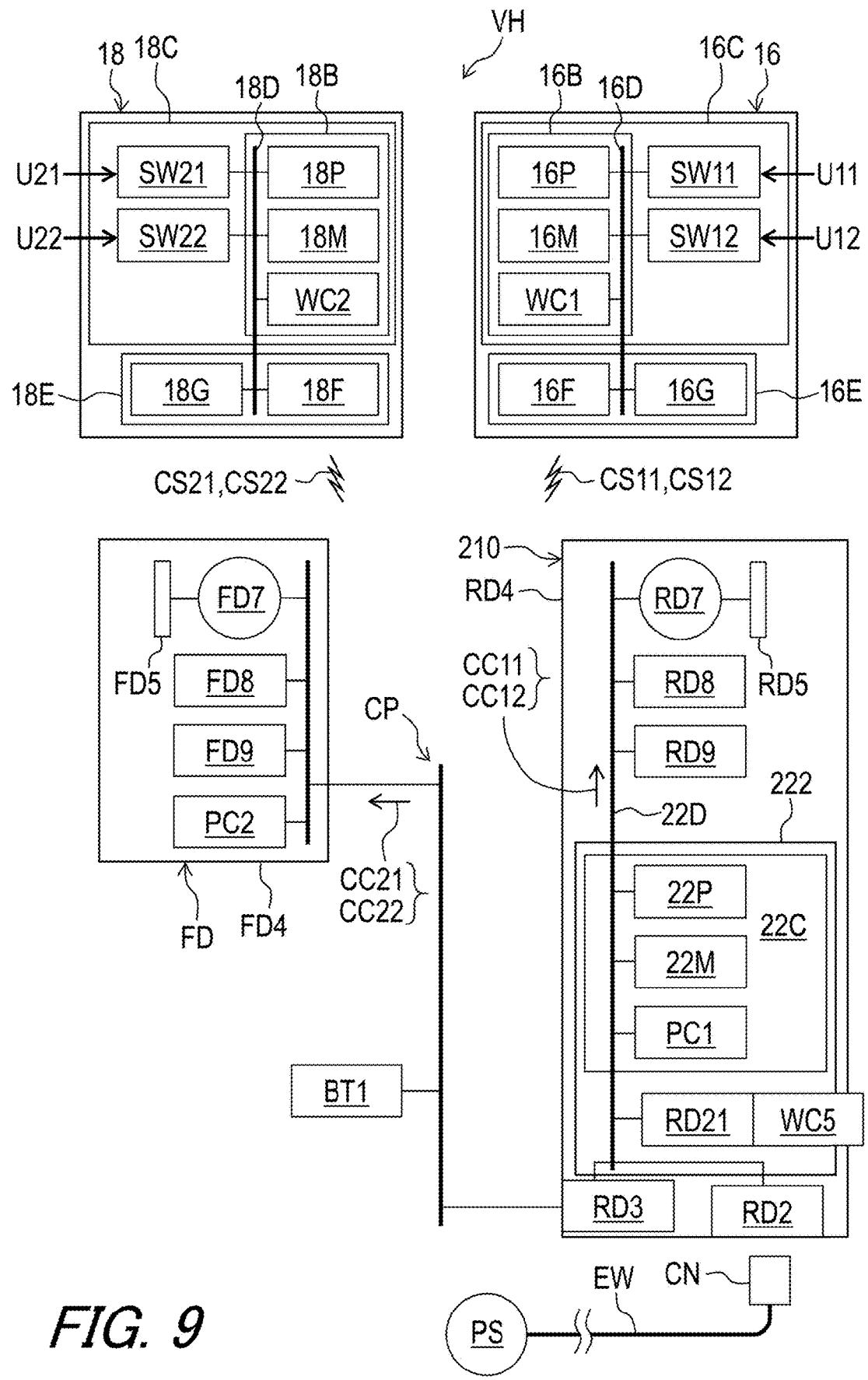
FIG. 9 is a schematic block diagram of the human-powered vehicle including the bicycle derailleur illustrated in FIG. 8.

As seen in FIG. 9, the human-powered vehicle VH comprises a controller 222. The controller 222 has substantially the same structure as the structure of the controller 22 of the first embodiment. The controller 222 is configured to be electrically connected to the bicycle derailleur 210, the bicycle derailleur 12, and the battery BT1 with the electric communication path CP. The controller 222 is configured to be communicate with the first operating device 16 and the second operating device 18 via the wireless communicator WC5. The controller 222 is configured to control the bicycle derailleur 210 based on the first control signal CS11 and the first additional control signal CS12. The controller 222 is configured to control the bicycle derailleur 12 based on the second control signal CS21 and the second additional control signal CS22.

In this embodiment, the controller 222 is configured to recognize the wireless communicator WC5 when the wireless communicator WC5 is electrically connected to the unit mounting portion RD21. The unit mounting portion RD21 is electrically connected to the circuit board 22C of the controller 222. The wireless communicator WC5 is configured to operate using electricity supplied from the battery BT1 through the electric communication path CP, the power supply portion RD3, and the unit mounting portion RD21.

Third Embodiment

A bicycle derailleur 310 in accordance with a second embodiment will be described below referring to FIGS. 10 and 11. The bicycle derailleur 310 has the same structure and/or configuration as those of the bicycle derailleur 210 except for the power supply portion RD3. Thus, elements having substantially the same function as those in the above embodiments will be numbered the same here and will not be described and/or illustrated again in detail here for the sake of brevity.

Figure 10:
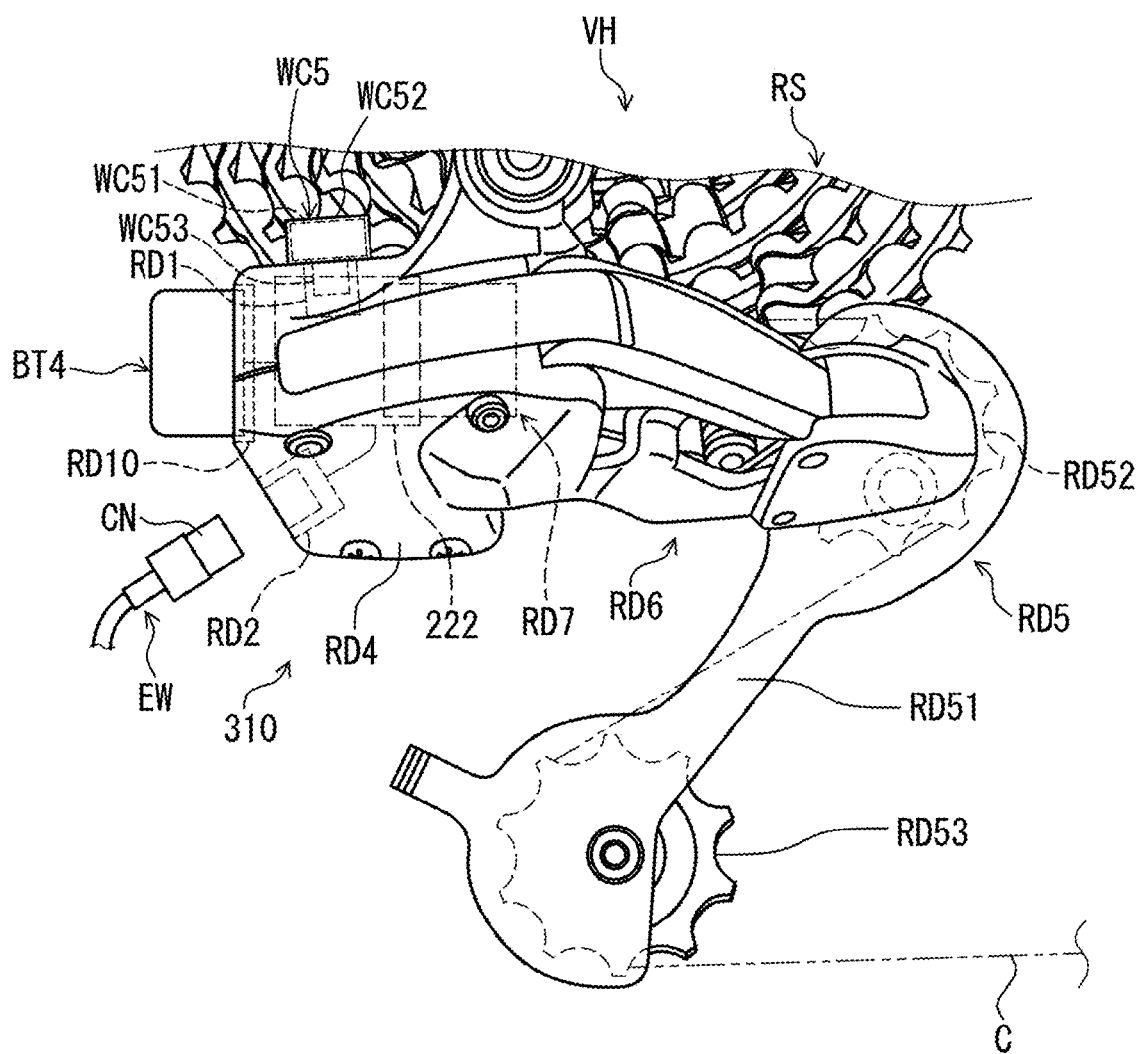
FIG. 10 is a side elevational view of a bicycle derailleur in accordance with a third embodiment.

As seen in FIG. 10, the bicycle derailleur 310 comprises the unit mounting portion RD21, a battery mounting portion RD10, the wireless communicator WC5, the electrical connector receiving portion RD2, and a battery BT4. The bicycle derailleur 310 further comprises the base member RD4, the movable member RD5, and the linkage structure RD6.

As with the second embodiment, the wireless communicator WC5 is detachably disposed at the unit mounting portion RD21. The electrical connector receiving portion RD2 is configured to receive the connector CN. In this embodiment, the power supply portion RD3 is omitted from the bicycle derailleur 310. Instead, the bicycle derailleur 310 comprises the battery mounting portion RD10. The battery BT4 is configured to be disposed at the battery mounting portion RD10. The battery BT4 is detachably disposed at the battery mounting portion RD10. The battery BT4 is detachably disposed at the battery mounting portion RD10 without substantial damage. The battery BT4 includes a rechargeable battery. The battery BT4 is charged with electricity through the electrical connector receiving portion RD2 and the battery mounting portion RD10.

Figure 11:
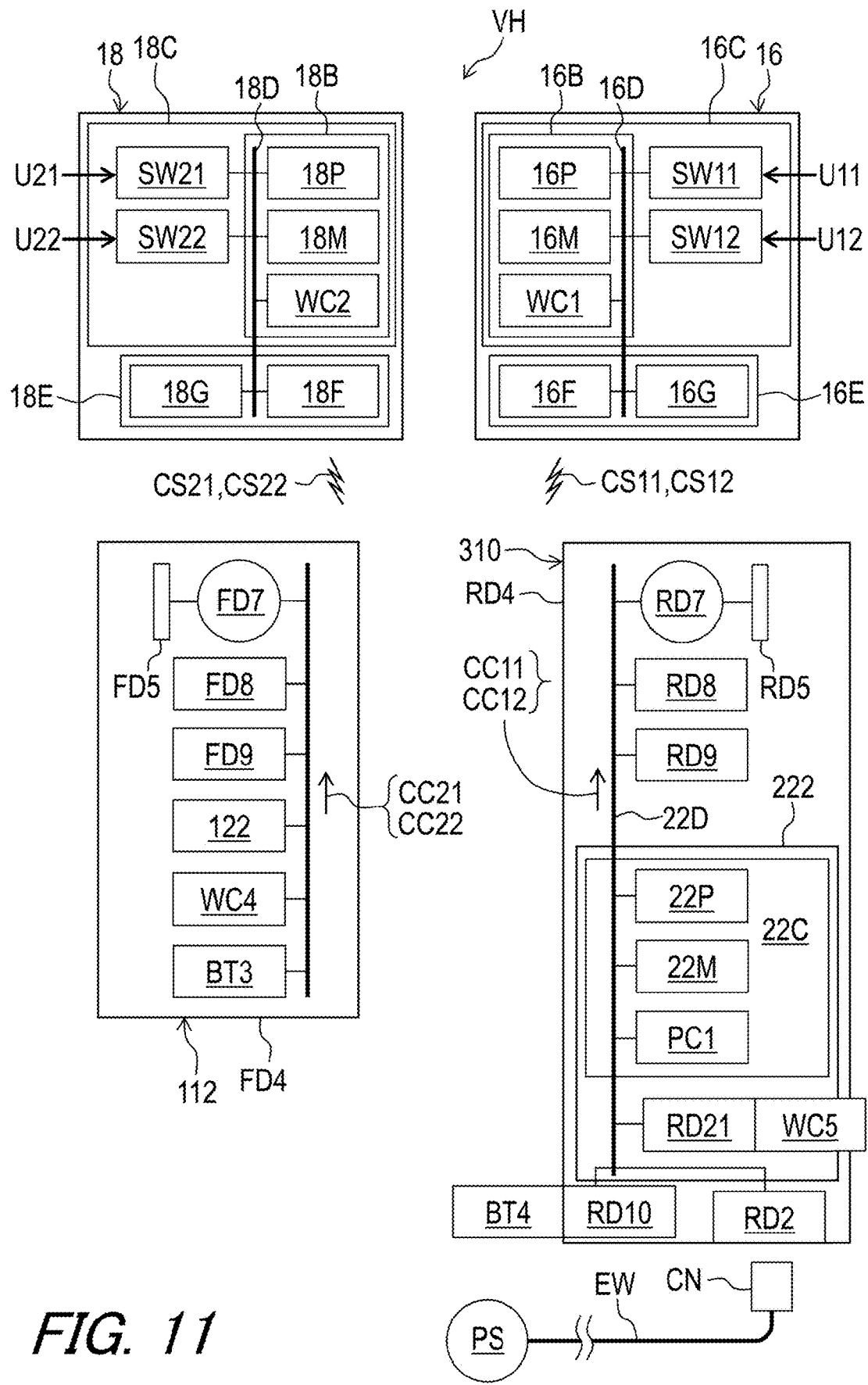
FIG. 11 is a schematic block diagram of the human-powered vehicle including the bicycle derailleur illustrated in FIG. 10.

As seen in FIG. 11, the bicycle derailleur 310 further comprises the motor unit RD7 configured to be supplied with electrical power from the battery BT4. The motor unit RD7 is electrically connected to the battery mounting portion RD10. The motor unit RD7 is disposed at the unit mounting portion RD21. The motor unit RD7 is electrically connected to the unit mounting portion RD21. The motor unit RD7 may include wireless communicator WC1.

As seen in FIGS. 10 and 11, in this embodiment, the battery mounting portion RD10 is configured to receive only a battery such as the battery BT4 and is configured not to receive an electric wire such as the electric wire C3 of the electric communication path CP. Thus, the battery BT1 and the electric communication path CP are omitted from the human-powered vehicle VH. The human-powered vehicle VH comprises the bicycle derailleur 112.

Modifications

In the first to third embodiments, the bicycle derailleur 10, 210, or 310 comprises the unit mounting portion RD1 or RD21, the wireless communicator WC1 or WC4, the electrical connector receiving portion RD2, and the power supply portion RD3. However, the unit mounting portion RD1 or RD21, the wireless communicator WC1 or WC4, the electrical connector receiving portion RD2, and the power supply portion RD3 can apply to the bicycle derailleurs 12 and 112.

In the first embodiment, the wireless communicator WC3 of the controller 22 is configured to wirelessly communicate with the wireless communicators WC1 and WC2 of the first operating device 16 and the second operating device 18. However, the wireless communicator WC3 of the controller 22 can be configured to wirelessly communicate with other devices such as the bicycle derailleur 12, an assist driving unit, an adjustable seatpost, a suspension, a cycle computer, a smartphone, a tablet computer, and a personal computer. The same modification can apply to the second and third embodiments and the modifications thereof.

Figure 12:
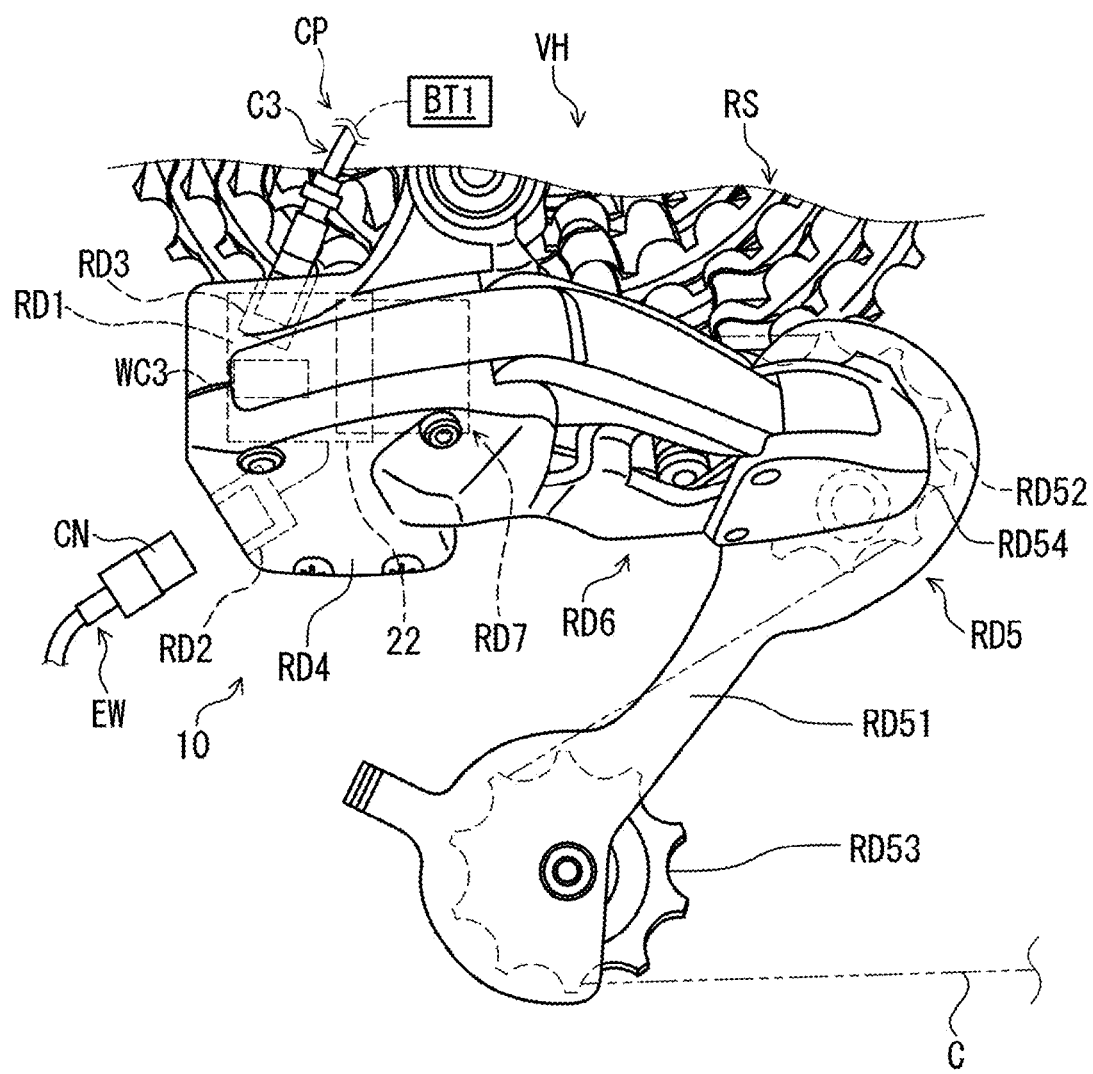
FIG. 12 is a side elevational view of the bicycle derailleur of the human-powered vehicle in accordance with a modification.

The location of the power supply portion RD3 is not limited to the above embodiments. As seen in FIG. 12, for example, the power supply portion RD3 can be provided at an upper portion of the electric component RD.

The front sprocket assembly FS can include only one sprocket. In such modifications, the electric component FD can be omitted from the human-powered vehicle VH. The gear changing function is integrated in the electric component RD if the electric component FD is omitted from the human-powered vehicle VH. This can simplify the construction of the human-powered vehicle VH. Furthermore, it is possible to arrange a battery configured to supply electricity to only the electric component RD in the vicinity of the electric component RD, giving additional weight to the electrical connector receiving portion RD2. Moreover, a total number of sprockets of the rear sprocket assembly RS can be 12, 13, 14, or more to ensure the preferable gear range if the front sprocket assembly FS includes only one sprocket.

In accordance with a first aspect, a bicycle derailleur comprises a unit mounting portion, a battery mounting portion, a wireless communicator, an electrical connector, and a battery. The wireless communicator is detachably disposed at the unit mounting portion. The electrical connector receiving portion is configured to receive a connector. The battery is configured to be disposed at the battery mounting portion.

With the bicycle derailleur according to the first aspect, it is possible to charge the battery through the electric connector receiving portion and the power supply portion. Furthermore, it is possible to utilize wireless communication and other communication methods.

In accordance with a second aspect, the bicycle derailleur according to the first aspect is configured so that the battery is detachably disposed at the battery mounting portion.

With the bicycle derailleur according to the second aspect, it is possible to replace the battery with another battery.

In accordance with a third aspect, the bicycle derailleur according to the first aspect further comprises a base member, a movable member, and a linkage structure. The base member is configured to be attached to a bicycle frame. The movable member is movable with respect to the base member. The linkage structure is connected with the base member and the movable member.

With the bicycle derailleur according to the third aspect, it is possible to move the movable member relative to the base member.

In accordance with a fourth aspect, the bicycle derailleur according to the third aspect is configured so that the unit mounting portion is positioned at one of the base member, the movable member, and the linkage structure.

With the bicycle derailleur according to the fourth aspect, it is possible to improve design flexibility of the bicycle derailleur.

In accordance with a fifth aspect, the bicycle derailleur according to the fourth aspect is configured so that the unit mounting portion is positioned at the base member.

With the bicycle derailleur according to the fifth aspect, it is possible to stabilize a position of the unit mounting portion.

In accordance with a sixth aspect, the bicycle derailleur according to the first aspect further comprises a motor unit configured to be supplied with electrical power from the battery.

With the bicycle derailleur according to the sixth aspect, it is possible to move another member using the motor unit.

In accordance with a seventh aspect, the bicycle derailleur according to the sixth aspect is configured so that the motor unit is disposed at the unit mounting portion.

With the bicycle derailleur according to the seventh aspect, it is possible to stabilize a position of the motor unit.

In accordance with an eighth aspect, the bicycle derailleur according to the seventh aspect further comprises a base member, a movable member, and a linkage structure. The base member is configured to be attached to a bicycle frame. The movable member is movable with respect to the base member. The linkage structure is connected with the base member and the moveable member. The unit mounting portion is positioned at the base member.

With the bicycle derailleur according to the eighth aspect, it is possible to stabilize a position of the unit mounting portion.

In accordance with a ninth aspect, the bicycle derailleur according to the third aspect is configured so that the electrical connector receiving portion is positioned at the base member.

With the bicycle derailleur according to the ninth aspect, it is possible to stabilize a position of the electrical connector receiving portion.

In accordance with a tenth aspect, the bicycle derailleur according to the first aspect is configured so that the electrical connector receiving portion includes a data communication interface.

With the bicycle derailleur according to the tenth aspect, it is possible to communicate with other devices through the electrical connector receiving portion.

In accordance with an eleventh aspect, the bicycle derailleur according to the first aspect is configured so that the electrical connector receiving portion includes a charging port.

With the bicycle derailleur according to the eleventh aspect, it is possible to charge the battery through the electrical connector receiving portion.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle derailleur comprising:
   a base member configured to be attached to a bicycle frame;
   a movable member movable with respect to the base member;
   a linkage structure connected with the base member and the movable member;
   a wireless communicator disposed at at least one of the base member, the movable member and the linkage member;
   an electrical connector receiving portion configured to receive a connector; and
   a power supply portion configured to receive electricity from a battery disposed at a location apart from the bicycle derailleur;
   the electrical connector receiving portion being configured to be electrically connected to the power supply portion; and
   the battery being configured to be charged with electricity through the electrical connector receiving portion and the power supply portion.

2. The bicycle derailleur according to claim 1, wherein the wireless communicator is non-detachably disposed at the at least one of the base member, the movable member and the linkage member.

3. The bicycle derailleur according to claim 1, wherein the wireless communicator is positioned at the base member.

4. The bicycle derailleur according to claim 1, wherein the wireless communicator is mounted on a circuit board, and
   the circuit board is disposed at the at least one of the base member, the movable member and the linkage member.

5. The bicycle derailleur according to claim 1, wherein the power supply portion is electrically connected to the battery via an electrical wire.

6. The bicycle derailleur according to claim 1, wherein the power supply portion is configured to receive an additional battery that is different from the battery.

7. The bicycle derailleur according to claim 1, further comprising:
   a motor unit configured to be supplied with electrical power from the battery.

8. The bicycle derailleur according to claim 7, wherein the motor unit is disposed at the at least one of the base member, the movable member and the linkage member.

9. The bicycle derailleur according to claim 7, further comprising:
the motor unit is positioned at the base member.

10. The bicycle derailleur according to claim 1, wherein the electrical connector receiving portion is positioned at the base member.

11. The bicycle derailleur according to claim 1, wherein the electrical connector receiving portion includes a data communication interface.

12. The bicycle derailleur according to claim 1, wherein the electrical connector receiving portion includes a charging port.

13. The bicycle derailleur according to claim 1, wherein the electrical connector receiving portion includes a charging port, and the connector is configured to be electrically connected to a power supply.

14. The bicycle derailleur according to claim 1, wherein the battery is configured to be electrically connected to the bicycle derailleur and an additional bicycle derailleur.

15. The bicycle derailleur according to claim 1, wherein the battery is provided in a seatpost of the bicycle frame.

16. The bicycle derailleur according to claim 1, wherein the power supply portion is disposed closer to the wireless communicator than the electrical connector receiving portion.

* * * * *